United States Patent
Ofenloch et al.

(10) Patent No.: US 11,068,015 B2
(45) Date of Patent: Jul. 20, 2021

(54) VARIABLE TRACK JOYSTICK DEVICES AND WORK VEHICLES CONTAINING THE SAME

(71) Applicant: Deere & Company, Moline, IL (US)

(72) Inventors: Timothy J. Ofenloch, Davenport, IA (US); Joshua D. Hoffman, Bettendorf, IA (US); Ryan G. Brown, Waterloo, IA (US); Kevin A. Wolff, Cedar Falls, IA (US); Mario L. Donini, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 125 days.

(21) Appl. No.: 16/401,496

(22) Filed: May 2, 2019

(65) Prior Publication Data

US 2020/0348714 A1    Nov. 5, 2020

(51) Int. Cl.
*G05G 9/00*     (2006.01)
*G05G 1/04*     (2006.01)
(Continued)

(52) U.S. Cl.
CPC .............. *G05G 9/00* (2013.01); *E02F 9/2004* (2013.01); *F16H 59/02* (2013.01); *F16H 61/24* (2013.01);
(Continued)

(58) Field of Classification Search
CPC ........ G05G 9/00; G05G 1/04; G05G 2700/10; G05G 9/047; G05G 9/04788; G05G 5/04;
(Continued)

(56) References Cited

U.S. PATENT DOCUMENTS

| 4,949,119 A | 8/1990 | Moncrief et al. | |
|---|---|---|---|
| 7,681,686 B1 * | 3/2010 | Kias | B60K 26/00 180/331 |
| 8,757,315 B1 * | 6/2014 | Wuisan | F16H 59/02 180/315 |
| 9,725,114 B1 * | 8/2017 | Brown | B62D 11/04 |
| 9,840,826 B2 * | 12/2017 | Huber | B60N 2/787 |

(Continued)

FOREIGN PATENT DOCUMENTS

| DE | 102017220990 A1 | 5/2019 | |
|---|---|---|---|
| EP | 1490610 B1 | 8/2012 | |
| EP | 3323135 B1 * | 2/2019 | ............. G05G 5/005 |

OTHER PUBLICATIONS

German Search Report issued in counterpart application No. 102020203532.6 dated Nov. 18, 2020 (10 pages).

*Primary Examiner* — James A English
*Assistant Examiner* — Kurtis Nielson
(74) *Attorney, Agent, or Firm* — Klintworth & Rozenblat IP LLP

(57) ABSTRACT

A variable track joystick device includes a support housing, a joystick movable with respect to the support housing, and a joystick guidance mechanism controllable to selectively confine joystick movement to a predetermined track pattern. During operation of the variable joystick device, a controller determines when the variable track joystick device is placed in a selected one of (i) a first mode in which joystick movement controls the first work vehicle function and (ii) a second mode in which joystick movement controls the second work vehicle function. The controller further commands the joystick guidance mechanism to restrict joystick movement to the predetermined track pattern when the joystick device is placed in the first mode, while permitting joystick movement outside of the predetermined track pattern when the joystick device is placed in the second mode.

18 Claims, 10 Drawing Sheets

(51) Int. Cl.
  *F16H 59/02* (2006.01)
  *F16H 61/24* (2006.01)
  *E02F 9/20* (2006.01)
  *G05G 9/047* (2006.01)
  *E02F 3/30* (2006.01)
  *F16H 19/04* (2006.01)

(52) U.S. Cl.
  CPC ............... *G05G 1/04* (2013.01); *G05G 9/047* (2013.01); *E02F 3/308* (2013.01); *F16H 19/04* (2013.01); *F16H 2059/0269* (2013.01); *F16H 2061/242* (2013.01); *G05G 2700/10* (2013.01)

(58) Field of Classification Search
  CPC .... F16H 61/24; F16H 59/02; F16H 2061/242; E02F 9/2004; B60K 2370/135
  USPC .......................................................... 180/333
  See application file for complete search history.

(56) References Cited

U.S. PATENT DOCUMENTS

| | | | |
|---|---|---|---|
| 10,240,321 B2* | 3/2019 | Kenkel | ................. E02F 9/2004 |
| 2003/0188594 A1* | 10/2003 | Levin | .................... F16H 59/044 |
| | | | 74/473.12 |
| 2006/0137931 A1* | 6/2006 | Berg | ........................ B62D 1/22 |
| | | | 180/333 |
| 2008/0184841 A1* | 8/2008 | Blind | ..................... G05G 9/047 |
| | | | 74/491 |
| 2014/0123803 A1* | 5/2014 | Yamada | ................. F16H 61/22 |
| | | | 74/527 |
| 2014/0158452 A1 | 6/2014 | Bowman et al. | |
| 2015/0020630 A1* | 1/2015 | Mueller | ................... G05G 1/04 |
| | | | 74/471 XY |
| 2017/0017256 A1* | 1/2017 | Nakano | ................... F16H 59/02 |
| 2017/0314231 A1* | 11/2017 | Park | ...................... F16K 31/602 |
| 2018/0179735 A1* | 6/2018 | Newlin | .................. F15B 13/022 |
| 2019/0018442 A1* | 1/2019 | Boving | ................. G05G 1/025 |

* cited by examiner

VARIABLE TRACK JOYSTICK DEVICES AND WORK VEHICLES CONTAINING THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to variable track joystick devices for usage in controlling multiple functions of a work vehicle, such as a tractor.

ABBREVIATIONS

Abbreviations appearing relatively infrequently in this document are defined upon initial usage, while abbreviations appearing more frequently in this document are defined below:
DOF—degree of freedom;
FEL—front end loader;
Multi-DOF—multiple degrees of freedom; and
ROM—range of motion.

BACKGROUND OF THE DISCLOSURE

Certain work vehicles are equipped with multiple joystick devices, with each joystick device utilized to control a different function of the work vehicle. Such joystick devices may differ not only in form and function, but may further include joysticks movable through distinct ROMs. Consider, for example, a tractor equipped with a joystick-controlled FEL system or assembly. At least two joystick devices may be located within the operator station or cabin of such an FEL-equipped tractor: a first joystick device utilized to control the tractor's transmission, and a second joystick device utilized to control FEL movement. The first (transmission-dedicated) joystick device, for example, adjust the speed and direction in which the tractor travels. The second (FEL-dedicated) joystick device may control the height and tilt angle of the FEL bucket. Other types of work vehicles are likewise equipped with multiple joystick devices for controlling different work vehicle functions, such as the movement of boom-mounted implements for performing various tasks in the agricultural, mining, forestry, and construction industries.

SUMMARY OF THE DISCLOSURE

A variable track joystick device is provided for usage in controlling at least first and second work vehicle functions. In embodiments, the variable track joystick device includes a support housing, a joystick movable with respect to the support housing, and a joystick guidance mechanism coupled to the support housing and controllable to selectively confine joystick movement to a predetermined track pattern. A controller is operably coupled to the joystick guidance mechanism. During operation of the joystick device, the controller determines when the variable track joystick device is placed in a selected one of: (i) a first mode in which joystick movement controls the first work vehicle function, and (ii) a second mode in which joystick movement controls the second work vehicle function. The controller further commands the joystick guidance mechanism to restrict joystick movement to the predetermined track pattern when the variable track joystick device is placed in the first mode, while permitting joystick movement outside of the predetermined track pattern when the variable track joystick device is placed in the second mode.

In other embodiments, the variable track joystick device includes a support housing, a joystick having a joystick base located within the support housing and a joystick handle projecting from the support housing, and a coupling provided between the joystick base and the support housing. The coupling permits rotation of the joystick base over an ROM relative to the support housing about first and second perpendicular axes. The variable track joystick device further contains a joystick guidance mechanism, which includes at least one guide member and an actuator. The actuator is mechanically linked to the guide member or members, which are coupled to the support housing and movable relative to the joystick base. The actuator is controllable to selectively move the guide member or members between (i) a blocking position in which the guide member or members encroach into the ROM of the joystick base to restrict joystick movement, and (ii) a non-blocking position in which the guide member or members reside outside of the ROM of the joystick base.

Embodiments of a work vehicle equipped with a variable track joystick device are further provided. In an embodiment, the work vehicle includes a transmission, a work implement, and a variable track joystick device. The variable track joystick device includes, in turn, a support housing, a joystick movable with respect to the support housing, a joystick guidance mechanism coupled to the support housing and controllable to selectively confine joystick movement to a predetermined track pattern, and a controller operably coupled to the joystick guidance mechanism. The controller is configured to determine when the variable track joystick device is placed in a selected one of (i) a transmission control mode in which joystick movement controls functioning of the transmission and (ii) a work implement control mode in which joystick movement controls movement or other functioning of the work implement. The controller further commands the joystick guidance mechanism to restrict joystick movement to the predetermined track pattern when the variable track joystick device is placed in the transmission control mode, while permitting joystick movement outside of the predetermined track pattern when the variable track joystick device is placed in the work implement control mode.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
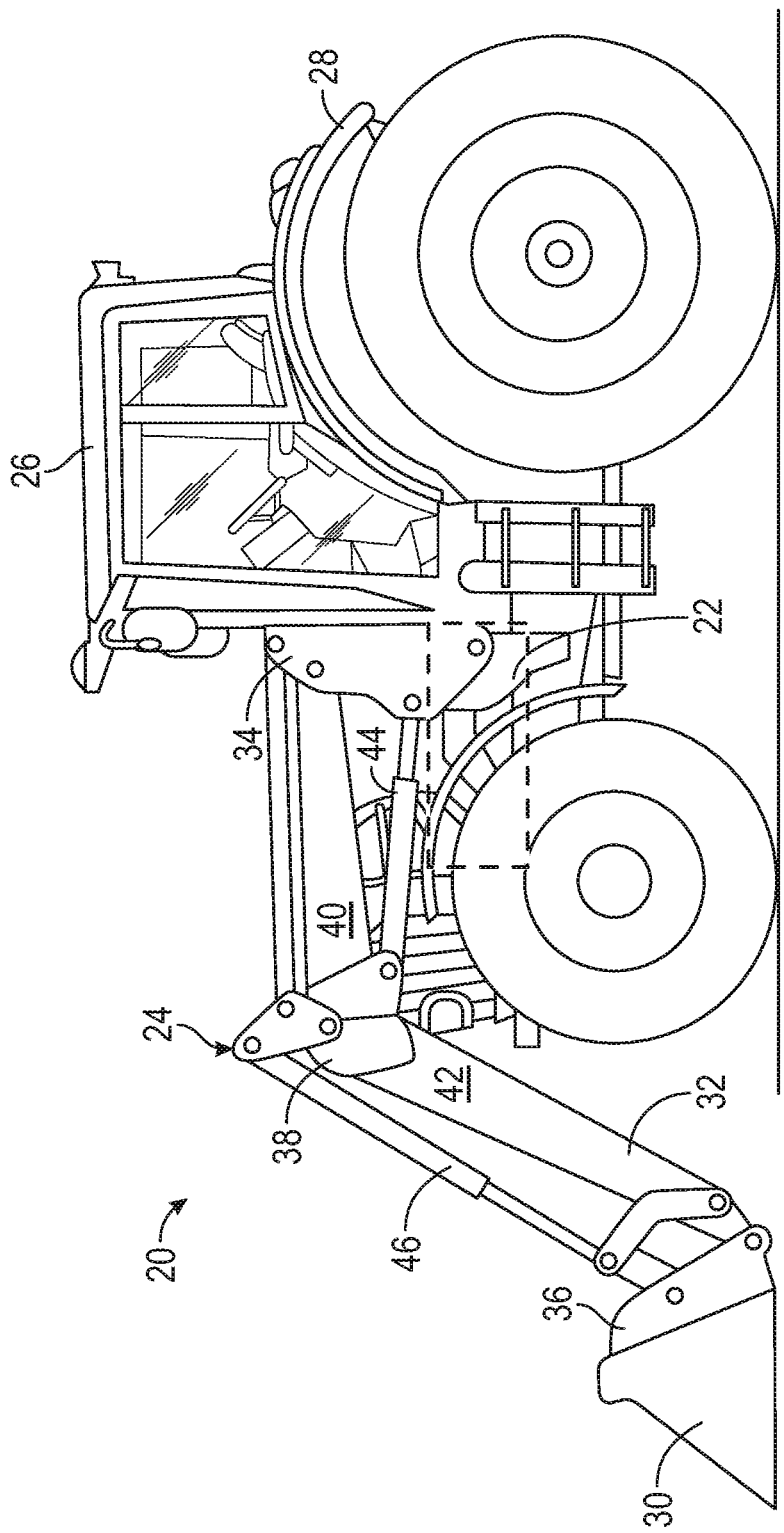
FIG. 1 is a side view of an example work vehicle (here, a tractor) having multiple functions suitably controlled utilizing an embodiment of the variable track joystick device.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As briefly discussed above, work vehicles may be equipped with multiple joystick devices for usage in controlling different work vehicle functions. The joystick devices may assume different forms, the buttons or other inputs provided on the joystick devices may differ, and the ROM of the joystick included in a particular joystick device may vary in relation to the work vehicle function controlled utilizing the joystick device. Such multi-joystick control schemes are well-established within industries employing work vehicles and provide a certain level of simplicity by associating each joystick device with control of a specific work vehicle function. The inclusion of multiple different joystick devices within a single work vehicle is, however, associated with several drawbacks. The need to furnish two (or more) function-specific joystick devices, as well as their associated interconnections and supportive hardware, introduces additional manufacturing cost, part count, and complexity into the overall construction of a work vehicle operator station. Additionally, the provision of multiple joystick devices, each including a joystick handle within comfortable reach of a human operator when seated within the operator station of a work vehicle, can place undesired spatial constraints on the layout of the joystick devices and other components (e.g., a center console, other input devices, etc.) within the operator station. As a still further drawback, requiring an operator to repeatedly transition between manipulating different joystick devices when operating a work vehicle can detract from operator focus and lower performance levels.

To overcome the limitations set-forth above, the following describes unique joystick devices suitable for usage in controlling multiple functions of a work vehicle, while selectively limiting joystick ROM in a manner best suited for controlling a presently-activated work vehicle function. In this regard, embodiments of the below-described joystick device may selectively limit joystick movement to at least one predetermined track pattern (herein, a "first fixed-track pattern") when the joystick device operates in a first mode in which joystick movement controls a first function of a work vehicle. In contrast, joystick movement is permitted outside of the first fixed-track pattern when the joystick device is placed in a second mode in which joystick movement controls a second function of the work vehicle. The term "controls," as appearing in this context, does not require that a particular work vehicle function is wholly controlled by joystick movement, rather only that an operator may move the joystick movement to adjust at least one operational aspect of the work vehicle function, as desired. The term "controls" is thus defined to encompass the term "help control" throughout this document. When placed in the second mode, the joystick device may permit movement over the full ROM permitted by the coupling formed between the joystick and a support housing of the joystick device; or, alternatively, may limit joystick movement in a different manner, such as by confining joystick movement to a second fixed-track pattern. As the joystick device selectively confines joystick movement to at least one fixed-track pattern based on the operational mode, the joystick device is referred to more fully herein as a "variable track joystick device." Further, in certain embodiments, the joystick device may be operable in three or more modes, may be capable of selecting confining joystick movement to any practical number of fixed-track patterns in addition to in lieu of selectively allowing joystick movement over a full or open ROM in at least one operational mode.

Depending upon design, the fixed-track pattern (or patterns) to which the joystick device selectively limits joystick movement can include any number of tracks in which the joystick may travel when manipulated by an operator. For example, in embodiments, the fixed-track pattern may include at least two intersecting tracks, each having a linear or curved geometry. As a more specific example, the fixed-track pattern may include or consist of two linear tracks, which intersect at a right angle to form a plus-shaped or cruciform pattern. The linear tracks may intersect at a centered or home position of the joystick, toward which the joystick may be biased utilizing, for example, one or more springs. In other embodiments, the fixed-track pattern may include one or more tracks having a more complex geometry, such as a stepped or sawtooth geometry. Depending upon the width of a given track, joystick movement may be confined to substantially bi-directional movement along the length or centerline of the track in some implementations. Comparatively, when joystick movement is permitted over an open, maximum, or full ROM, the joystick may be moved in multiple DOFs regardless of joystick position, limited only by the coupling provided between the joystick and the support housing.

The work vehicle functions controlled utilizing the variable track joystick device will vary between embodiments depending upon a number of factors including, for example, the type of work vehicle into which the joystick device is incorporated. To provide a useful, albeit non-limiting example, the following will principally discuss embodiments of the variable track joystick device in the context of a tractor equipped with a forward, boom-mounted work implement, namely, an FEL bucket. In this instance, and as described below, the variable track joystick device may be utilized to control: (i) functional aspects of the tractor's transmission when the joystick device is placed in a first mode and joystick movement is confined to a fixed-track pattern; and (ii) movement of the FEL bucket when the joystick device is placed in a second mode in which joystick movement is permitted outside of (beyond the bounds of) the fixed-track pattern. The following example notwithstanding, embodiments of the variable track joystick device are not restricted to deployment within any particular type of work vehicle; nor are embodiments of the variable track joystick device restricted to usage in controlling any particular set of work vehicle functions. Rather, embodiments of the variable track joystick device can be utilized to control a wide range of work vehicle functions amenable to joystick control including, but not limited to movement of other types of boom-mounted work implements, such as the felling head of a feller buncher, the bucket (or other end effector) of an excavator, the blade of a dozer, or another attachment (e.g., a bale spear) mounted to the front end or rear end of a tractor, to list but a few examples.

Example of a Work Vehicle Having Multiple Functions Suitably Controlled Utilizing a Variable Track Joystick Device FIG. 1 is a side view of a work vehicle (here, a tractor 20) having at least two joystick-controlled work vehicle functions and illustrated in accordance with an example embodiment of the present disclosure. As appearing herein, the term "joystick-controlled function" refers to a functionality or operational aspect of a work vehicle controlled, at least in part, by movement of a joystick included in a joystick device. In the present example, the joystick-controlled functions of the tractor 20 include at least: (i) control of certain operational aspects of a transmission contained in the tractor 20 and generically represented by dashed box 22 in FIG. 1, and (ii) control of certain operational aspects of an FEL system 24 mounted to the front end of the tractor 20. Traditionally, such joystick-controlled functions are controlled utilizing a first joystick device dedicated to controlling the tractor transmission and a second, independent joystick device dedicated to controlling FEL movement. However, in accordance with embodiments of the present disclosure, both of the foregoing work vehicle functions are controlled, at least in part, utilizing a common variable track joystick device as described more fully below.

Discussing the tractor 20 in greater detail, the example tractor 20 includes an operator station 26, such as an environmentally-sealed cabin, located above a wheeled vehicle chassis or tractor body 28. A work implement 30, as included in the FEL system 24, is mounted to a forward portion of the tractor body 28 by a boom assembly 32 further included in the FEL system 24. In the illustrated example, the work implement 30 assumes the form of a bucket and is consequently referred to as hereafter as the "FEL bucket 30." The present example notwithstanding, the FEL bucket 30 can be replaced by a different type of work implement, such as a forklift implement or a bale spear, in alternative embodiments of the tractor 20. Furthermore, in alternative embodiments, a second type of work implement can be mounted to the rear of the tractor 20, such as a backhoe, and potentially also controlled utilizing the below-described variable track joystick device.

In the example of FIG. 1, the boom assembly 32 includes an aft bracket 34 affixed to the tractor body 28, a forward bracket 36 to which the work implement 30 is pivotally attached, and an intermediate or mid bracket 38 between the brackets 34, 36. Twin lift arms 40 (one of which can be seen in FIG. 1) pivotally attach the aft bracket 34 to the mid bracket 38, which is, in turn, attached to the forward bracket 36 by twin bucket arms 42 (again only one of which can be seen). Twin hydraulic lift cylinders 44 are further mounted between the aft bracket 34 and the mid bracket 38, while twin hydraulic bucket cylinders 46 are mounted between the mid bracket 38 and the forward bracket 36. When the FEL system 24 is mounted to the front end of the tractor body 28, non-illustrated hydraulic lines of the FEL system 24 are fluidly connected to a pressurized hydraulic fluid supply on the tractor 20 in a manner permitting an operator seated within the operator station 26 to control the hydraulic cylinders 44, 46.

An operator can command the boom assembly 32 to lift the FEL bucket 30 by controlling the hydraulic lift cylinders 44 to extend. As the hydraulic lift cylinders 44 extend, the FEL bucket 30 is lifted from the ground position shown in FIG. 1, travels through an intermediate or mast level position, and is raised to a full height position. Similarly, as the hydraulic bucket cylinders 46 retract in response to operator commands, the boom assembly 32 tilts the FEL bucket 30 from the forward-facing open or scoop position (shown in FIG. 1), through an intermediate position, and to the upright position. Conversely, from the full height position, the operator can control the boom assembly 32 to stroke the hydraulic cylinders 44, 46 in a manner opposite that just described to return the FEL bucket 30 to the grounded, scoop position shown in FIG. 1. The operator may control the cylinders 44, 46 to extend and retract, as desired, through movement of a joystick included in a variable track joystick device located within the operator station 26 of the tractor 20, as further discussed below in connection with FIG. 2.

Figure 2:
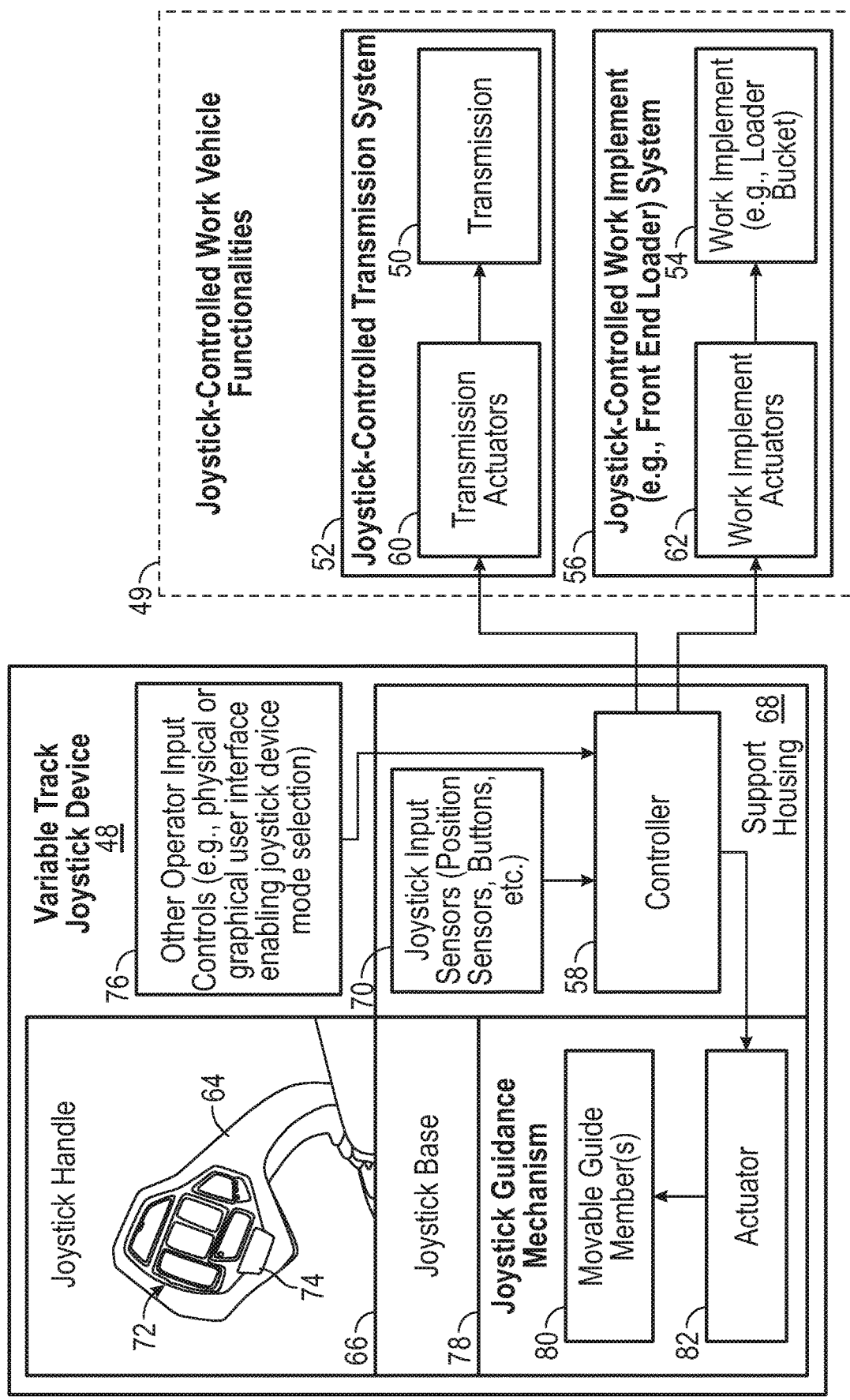
FIG. 2 is a schematic of an example variable track joystick device and two work vehicle systems having functions suitably controlled utilizing the joystick device, as usefully incorporated into the work vehicle shown in FIG. 1.

Turning to FIG. 2, a number of the components or systems suitably included in the tractor 20 and controlled utilizing a variable track joystick device 48 are schematically presented, as illustrated in accordance with an embodiment of the present disclosure. As shown on the right side of this drawing figure, the work vehicle functions 49 controlled utilizing the example variable track joystick device 48 may include: (i) functioning of a work vehicle transmission 50 contained in a joystick-controlled transmission system 52, and (ii) movement of a work implement 54 contained in a joystick-controlled work implement system 56. Correlating FIG. 2 with FIG. 1, the work vehicle transmission 50 shown in FIG. 2 may correspond to dashed box 22 in FIG. 1, while the work implement 54 and the joystick-controlled work implement system 56 shown in FIG. 2 correspond to the FEL bucket 30 and the FEL system 24 shown in FIG. 1, respectively.

Among other components, the variable track joystick device 48 includes a at least one processor or controller 58. The controller 58 implements or effectuates operator commands by transmitting corresponding signals to actuators, such as control valves or electric actuators, included in the systems controlled utilizing the variable track joystick device 48. Thus, in the example of FIG. 2, the controller 58 may transmit signals to any number of actuators 60 contained in the transmission system 52 to effectuate operator commands received via the variable track joystick device 48. Similarly, the controller 58 likewise transmits commands signals to any number of actuators 62 contained in the work implement system 56 to effectuate operator commands when received via the joystick device 48. The signals transmitted to the actuators 60, 62 can be hydraulic, pneumatic, or electric (wired or wireless) in nature, depending upon actuator type. For example, in the case of the FEL system 24 (FIG. 1), the controller 58 may transmit electrical signals to valve controllers, which, in turn, vary hydraulic fluid flow to the hydraulic cylinders 44, 46 (corresponding to the actuators 62 in FIG. 2) to implement operator input commands received via the joystick device 48. Various other control schemes are also possible, with the embodiment of FIG. 2 merely serving as one generalized example.

While represented in FIG. 2 by a single box and referred to as a "controller" for convenience of reference, the controller 58 can include one or more processors and other components, such as printed circuit boards and memory structures, which collectively perform the signal processing and control functions described herein. Generally, then, the term "controller" broadly encompasses any number and type of processors, possibly in addition to other microelectronic components or logic structures, which are operably interconnected to provide the processing capabilities of the variable track joystick device 48. The controller 58 may also include memory containing computer-readable instructions and logic, as appropriate. Any such computer-readable instructions and logic may be realized in any combination of hardware, firmware, and software, potentially including software programs or applications directing the various hardware features of the variable track joystick device 48 to perform the functions described throughout this document when executed. The controller 58 may be contained within the support housing 68, as generally indicated in schematic of FIG. 2. Alternatively, the controller 58 (and various other components of the variable track joystick device 48) can be situated outside of the support housing 68 in further embodiments of the joystick device 48.

In addition to the controller 58, the variable track joystick device 48 further includes a joystick 64, 66, which is mounted to a support housing 68 for movement with respect thereto. The joystick 64, 66 includes, in turn, a joystick handle 64 and a joystick base 66. The joystick handle 64 projects from the support housing 68 in, for example, a generally upward direction to allow an operator seated within operator station 26 of the tractor 20 (FIG. 1) to comfortably grasp and manipulate the handle portion 64 of the joystick 64, 66 when piloting the tractor 20. The joystick base 66 is fixedly joined to the joystick handle 64 and located within the support housing 68. The joystick base 66 is mounted to the support housing 68 by a coupling or joint, which permits movement of the joystick 64, 66 in at least one and, preferably, multiple degrees of freedom. As just stated, the joystick base 66 is rigidly joined to the joystick handle 64 such that the joystick base 66 and the joystick handle 64 move as a single unit or rigid body. In certain embodiments, portions of the joystick handle 64 and the joystick base 66 may be integrally formed as single piece. The construction of the joystick 64, 66 is, however, largely inconsequential to the present disclosure, providing that the joystick 64, 66 can be rotated or otherwise moved relative to the support housing 68 in one or more degrees of freedom, as discussed below.

Any number of sensors 70 may be included in the variable track joystick device 48, distributed through the support housing 68, and coupled in signal communication with the controller 58. Certain ones of the sensors 70 are utilized to monitor movement of the joystick 64, 66 relative to the support housing 68 and, therefore, relative to a spatial frame of reference fixed relative to the operator station 26 of tractor 20 (FIG. 1). Various different optical and non-optical sensors or transformers can be utilized for this purpose. The sensors 70 of joystick device 48 may further include any number and type of physical inputs present on the joystick handle 64, on the exterior of the support housing 68, or on any other operator-accessible surface of the variable track joystick device 48. In many instances, such additional sensors 70 will include one or more buttons, switches, dials, or the like, which can be selected or otherwise manipulated by an operator when utilized the variable track joystick device 48 to further control the work vehicle functions 48 or, perhaps, other non-joystick-controlled functions of the tractor 20. Examples of such additional sensors 70 are shown in the upper left corner of FIG. 2 as a button cluster 72 positioned for convenient engagement by an operator's thumb when grasping the joystick handle 64.

When present on the exterior of the joystick handle 64, or possibly on another surface of the joystick device 48, the button cluster 72 may include a button 74 for switching between the operational modes of the variable track joystick device 48; e.g., in the present example, for switching between the below-described transmission control mode and the FEL control mode of the joystick device 48. In other instances, a different mechanism may be provided for switching between the variable track joystick device 48 in addition to or in lieu of the physical button 74. For example, the variable track joystick device 48 may further include one or more input devices 76 separate and apart from the joystick input sensors 70, which enable an operator to switch between the operational modes of the joystick device 48. In this latter case, the other operator input controls 76 may be physical in nature or, instead, may assume another form; e.g., a voice input interface or a graphical user interface (GUI) selection option presented on a non-illustrated display screen. In the latter regard, an operator of the tractor 20 may select the operational mode of the joystick device 48 by navigating through a GUI utilizing an appropriate input device (e.g., a cursor device or by touch input) and then selecting a widget controlling the mode selection. In this and other instances, the variable track joystick device 48 may normally operate in a default modality (e.g., the below-described transmission control modality) and transition to the second modality (or, perhaps, a still further modality) when selected via operator input. If desired, the controller 58 may also be configured to return the variable track joystick device 48 to a default modality, such as the below-described transmission control modality, upon tractor shutdown or startup.

The example variable track joystick device 48 further contains a joystick guidance mechanism 78. As appearing herein, the term "joystick guidance mechanism" refers to any mechanism or device controllable to selectively limit or confine the ROM of a joystick in a predetermined manner; e.g., such that the desired confinement of the joystick movement to at least one predetermined track pattern can be applied and removed, as appropriate. In the illustrated example, the joystick guidance mechanism 78 includes one or more movable guide members 80, which can be moved relative to the joystick base 66 by an actuator 82 to selectively block rotation of the joystick 64, 66, and, specifically, movement of the joystick base 66 within the support housing 68. In other instances, and as discussed below, the joystick guidance mechanism 78 may selectively confine joystick movement to one or more predetermined track patterns in a different manner; e.g., utilizing an electromagnetic joystick guidance scheme in which the controller 58 selectively energizes an array of electromagnetics to confine movement of the joystick 64, 66 to one or more fixed-track patterns (and, perhaps, other limited ROMs) when so desired. In such alternative implementations, the joystick guidance mechanism 78 may lack the movable guide member(s) 80.

Figure 3:
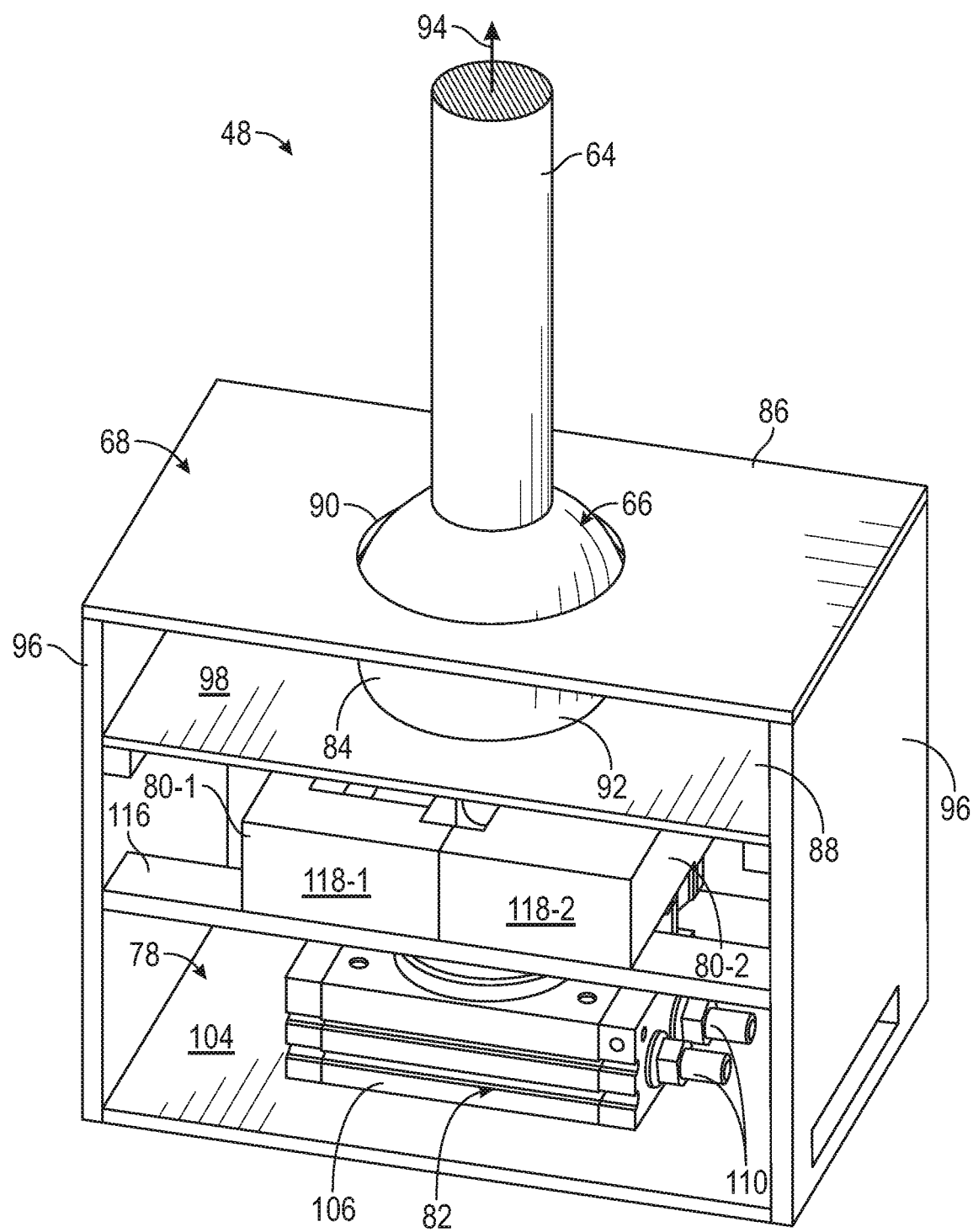
FIG. 3 is an isometric view of a simplified implementation of the example variable track joystick device (partially shown) in a first mode in which the joystick movement controls a first work vehicle function, such as operation of the transmission system shown in FIG. 2.
Figure 4:
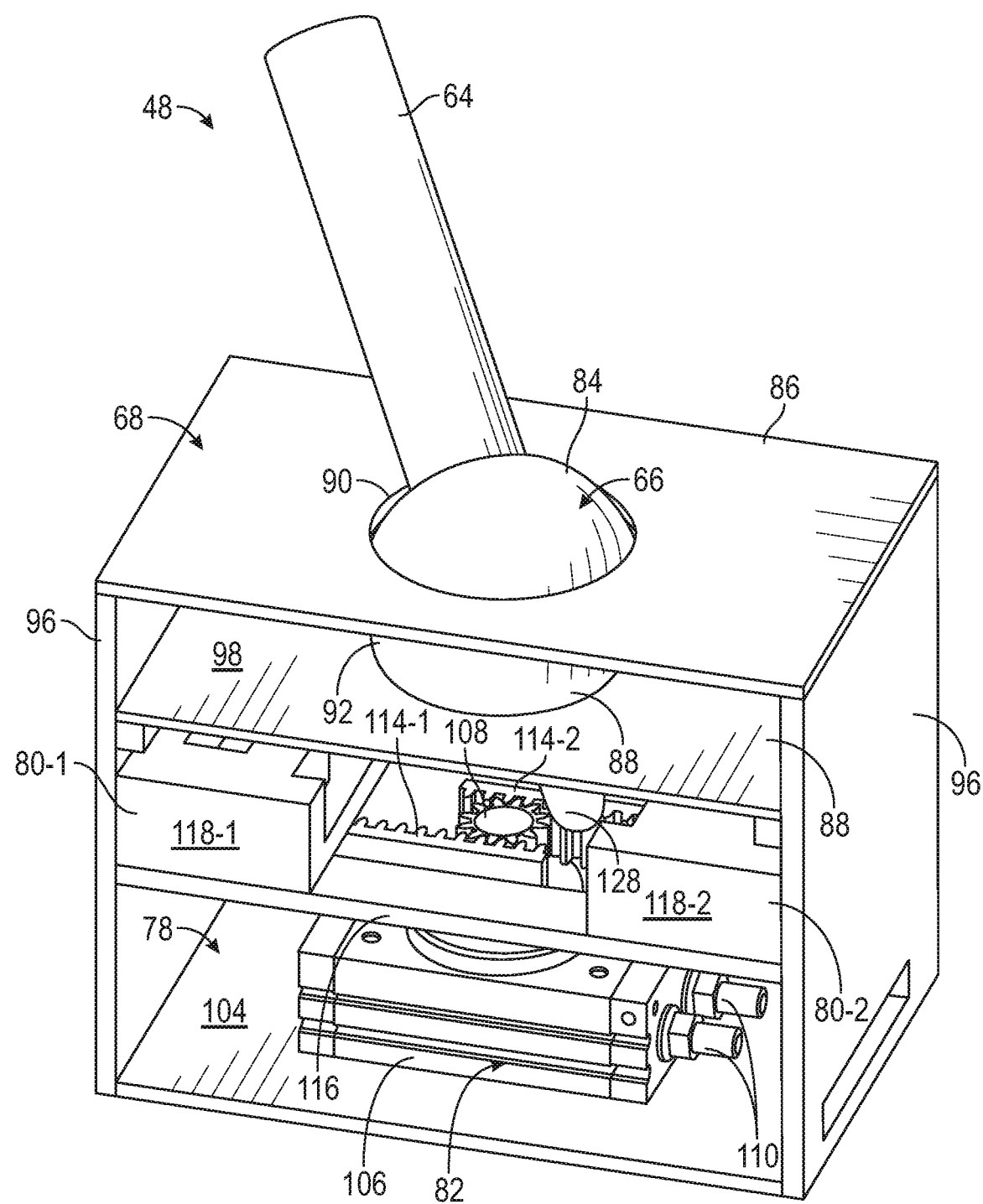
FIG. 4 is an isometric view of the variable track joystick device (partially shown) in a second mode in which the joystick movement controls a second work vehicle function, such as operation of the work implement system (e.g., movement of the FEL bucket shown in FIG. 1)
Figure 5:
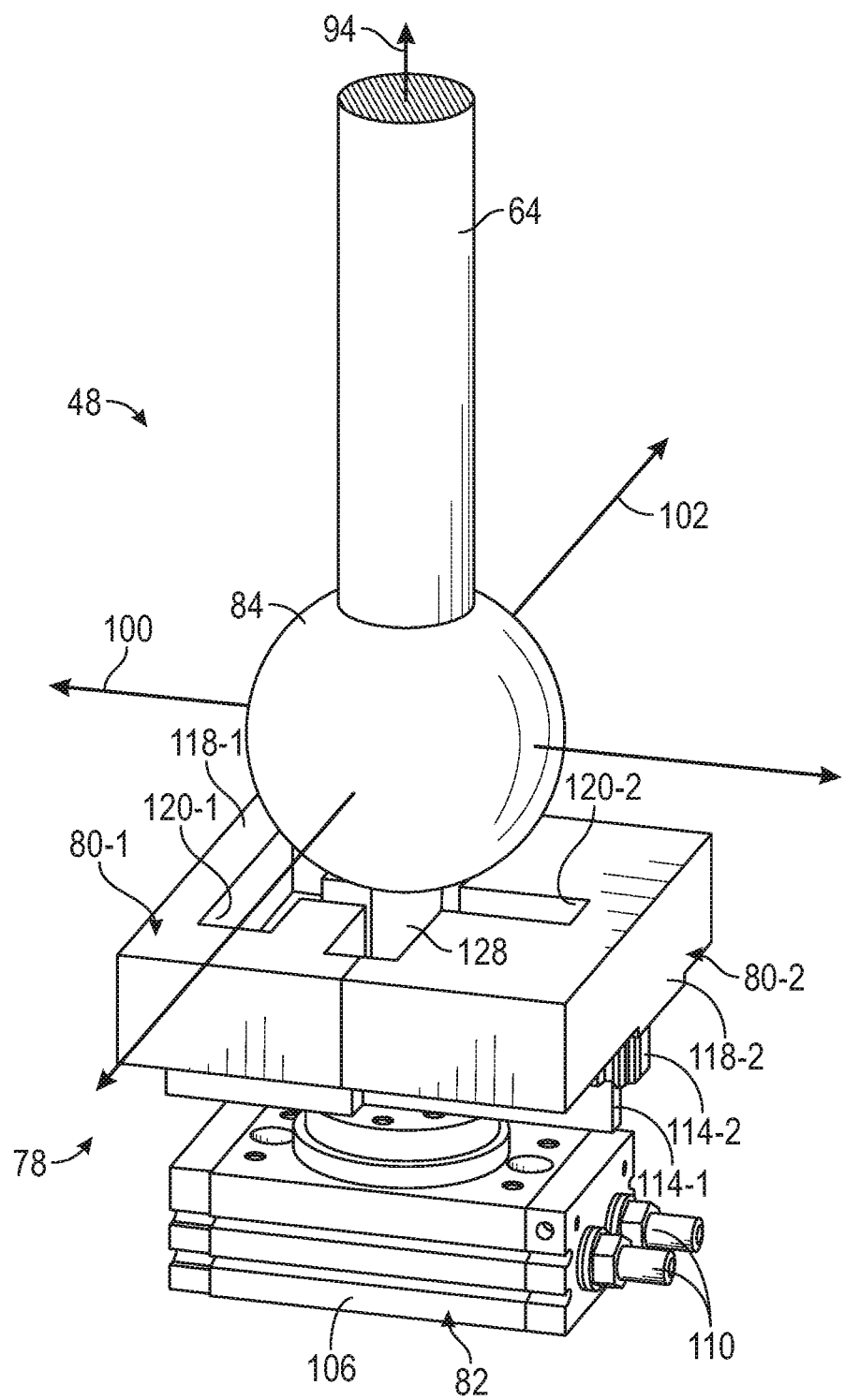
FIGS. 5 and 6 are isometric views of the variable track joystick device shown in FIGS. 3 and 4 with the support housing hidden from view, as depicted in the first and second modes, respectively.
Figure 6:
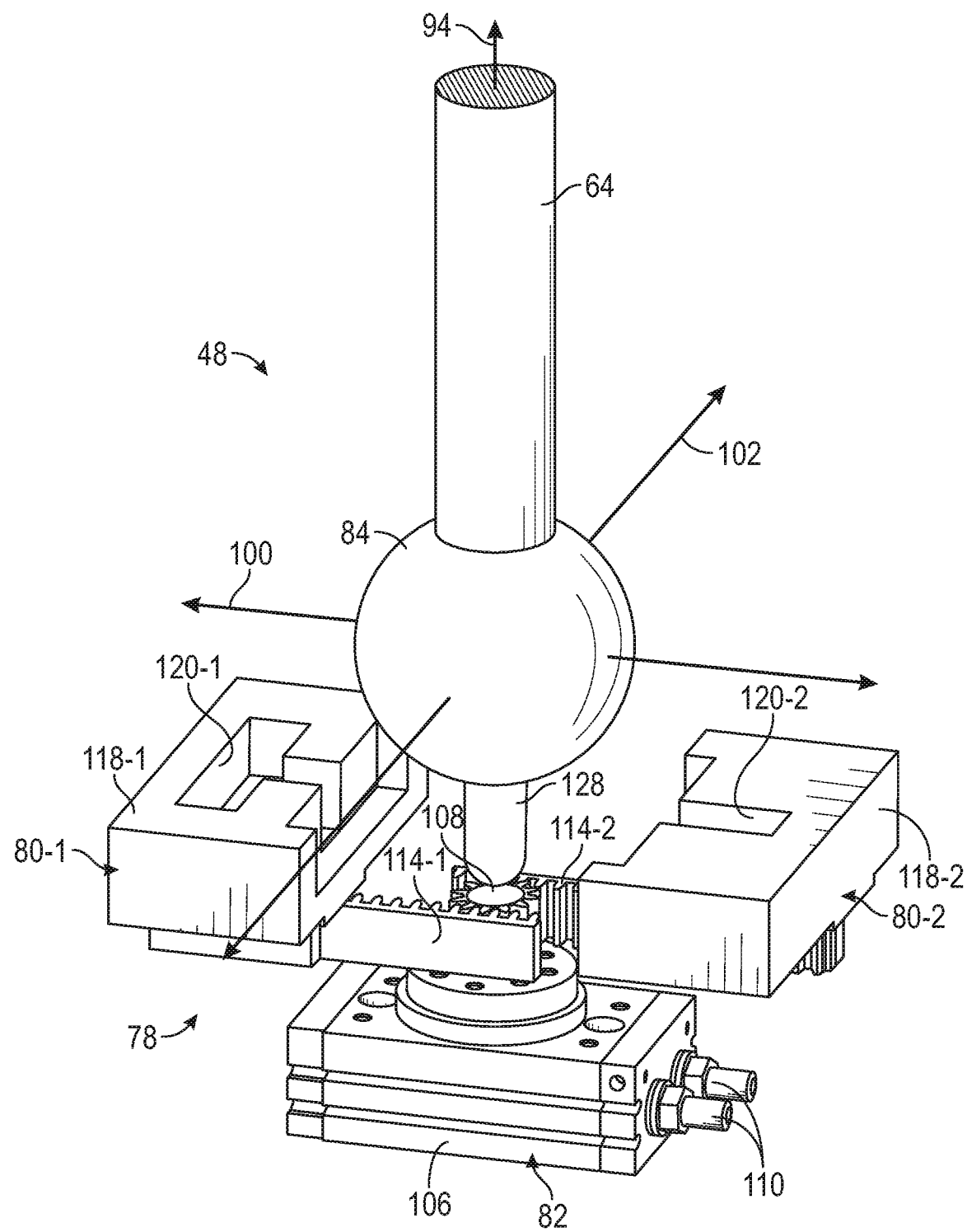

Progressing to FIGS. 3-6, a simplified example implementation of the variable track joystick device 48 is presented, with like reference numerals carried-over from FIG. 2 to FIGS. 3-6 (and the other drawing figures) for ease of reference. The implementation of the variable track joystick device 48 shown in FIGS. 3-6 is provided by way of non-limiting example only, again noting that the joystick device 48 is shown in a simplified form for purposes of explanation. For example, it can be seen that the variable track joystick device 48 includes a joystick 64, 66 mounted for movement relative to a base structure or support housing 68. The joystick 64, 66 is shown in a generalized, "cartoon" form including a stick-like joystick handle 64 partially shown and lacking buttons or other inputs for illustrative clarity. A more realistic depiction of a more complex, contoured form that may be assumed by the joystick handle 64 in a real-world implementation is shown in the upper left corner of FIG. 2, as previously described.

As is the joystick 64, 66, the support housing 68 of the variable track joystick device 48 is shown in a simplified, box-like form in FIGS. 3 and 4, which lacks various brackets, fasteners, and the like. Further, a wall of the support housing 68 is hidden from view in FIGS. 3 and 4 (and the support housing 68 is entirely hidden from view in FIGS. 5 and 6) to reveal the interior compartments and components of the example joystick device 48. In other implementations, the support housing 68 may assume various other forms, which will typically be more complex and contoured for aesthetic integration into the surrounding facia of the operator station 26. The variable track joystick device 48 will also include various other features in actual implementations, such sensors for monitoring joystick position (corresponding to the sensors 70 labeled in FIG. 2) and/or one or more springs for biasing the joystick 64, 66 toward the centered or home position discussed below.

As briefly indicated above, a multi-DOF coupling is provided between the joystick 64, 66 and the support housing 68. In the example of FIGS. 3-6, the multi-DOF coupling assumes the form of a ball-and-socket joint formed between a generally spherical region 84 of the joystick base 66 and walls 86, 88 of the support housing 68. Accordingly, the support housing may include an upper wall or cover plate 86 through which a first central aperture or opening 90 is provided. Additionally, the support housing 68 may include an inner wall 88 (herein, the "inner cradle wall" 88), which is located beneath the cover plate 86 and which likewise includes a central opening 92 formed therethrough. The openings 90, 92 formed through the cover plate 86 and the inner cradle wall 88 are substantially co-axial along a centerline or longitudinal axis 94 of the joystick 64, 66, as considered when in the centered or home position; that is, the non-displaced position shown in FIGS. 3, 5, and 6. The cover plate 86 and the inner cradle wall 88, along with the sidewalls 96 of the support housing 68, cooperate to define a first compartment 98 in which the generally spherical region 84 of the joystick 64, 66 resides.

The respective diameters of the openings 90, 92 are less than the maximum diameter of the generally spherical region 84 of the joystick base 66. The generally spherical region 84 is thus physically captured between the cover plate 86 and the inner cradle wall 88 when the variable track joystick device 48 is assembled. Concurrently, due to the ball-and-socket construction of this interface, the generally spherical region 84 and, more generally, the joystick 64, 66 is able to rotate relative to the support housing 68 about two rotational axes 100, 102, as identified in FIGS. 5 and 6. The rotational axes 100, 102 are perpendicular and intersect at a center-point of the generally spherical region 84. Consequently, absent additional mechanical guidance or interference, the joystick 64, 66 can rotate freely about the rotational axes 100, 102 and thereby move relative to the support housing 68. Such free rotation may continue in a given direction until a lower portion of the joystick handle 64 is brought into contact with an edge of the cover plate 86 adjacent the central opening 90 formed therein. When the joystick 64, 66 is movable across the maximum range of motion permitted by the multi-DOF coupling between the joystick base 66 and the support housing 86 (unfettered by physical interface provided by the guide members 80-1, 80-2), the joystick 64, 66 may be described as being movable over its open or full ROM.

In further embodiments, a different ball-and-socket coupling can be formed between the joystick 64, 66 and the support housing 68. For example, the support housing 68 can include a more complete or defined generally spherical cavity in certain implementations. In such implementations, the interior surfaces of the generally spherical cavity may be studded with ball bearings or, instead, the exterior of the generally spherical region 84 can be studded with ball bearings to facilitate movement of the joystick 64, 66 relative to the support housing 68. Alternatively, a low friction coating or sleeve may be present. Further, the generally spherical region 84 (and any associated cavity) can be imparted with an increasing flattened or imperfect spherical shape, while still permitting rotation of the joystick 64, 66 about the rotational axes 100, 102 (FIGS. 5 and 6). Various other multi-DOF couplings are also possible and equally viable, providing that the joystick 64, 66 can rotate, slide, or otherwise move relative to the support housing 68 in at least two degrees of freedom. Such other multi-DOF couplings are known in the context of joystick devices and include, but are not limited to, gimbal-type couplings and resilient (e.g., spring mount) couplings.

As previously mentioned, the joystick guidance mechanism 78 includes at least one moveable guide member 80 mechanically linked to an actuator 82, either directly or indirectly through any number of intervening components. The guide member(s) 80 and the actuator 82 can assume various forms suitable for selectively confining movement of the joystick 64, 66 to a fixed-track pattern in response to commands received from the controller 58 (FIG. 1). In the example of FIGS. 3-6, specifically, the joystick guidance mechanism 78 includes two such movable guide members 80-1, 80-2, which are selectively moved between predefined positions by the actuator 82 located in a lower compartment 104 of the support housing 68. The actuator 82 is controllable to selectively move the guide members 80-1, 80-2 between a blocking position (shown in FIGS. 3 and 5) and a non-blocking position (shown in FIGS. 4 and 6). When in the blocking position, the guide members 80-1, 80-2 encroach into the ROM of the joystick base 66 to restrict rotation of the joystick 64, 66 to a fixed-track pattern, as discussed below in connection with FIG. 9. The blocking position of the guide members 80-1, 80-2 thus corresponds to the first (transmission control) mode in the illustrated example. Conversely, when in the non-blocking position corresponding to the second (FEL control) mode of the variable track joystick device 48, the guide members 80-1, 80-2 may be positioned outside of the ROM of the joystick base 66, as described below in connection with FIG. 10. As a result, movement of the joystick 64, 66 beyond the predetermined track pattern is enabled, perhaps over the full or open ROM of the joystick device 48 permitted by the multi-DOF coupling between the joystick base 66 and the support housing 68.

The actuator 82 of the joystick guidance mechanism 78 can assume various forms for moving the guide members 80-1, 80-2 between the blocking and non-blocking positions in response to commands received from the controller 58 (FIG. 2). In the illustrated example, the actuator 82 assumes the form of an electric actuator having a housing or body 106, a rotatable output shaft extending from the actuator body 106, and a gear or pinion 108 mounted to the outer terminal end of the output shaft. Input/Output (I/O) terminals 110 project from a side of the actuator 82 for connection to the controller 58 (FIG. 2) utilizing suitable wires or other connectors, which may pass through an opening 112 provided in one of the sidewalls 96 of the support housing 68 (FIGS. 3 and 4). The pinion 108 is engaged on opposing sides by two toothed racks 114-1, 114-2, which are affixed to the guide members 80-1, 80-2, respectively. As the toothed racks 114-1, 114-2 are placed in mesh engagement with opposing sides of the pinion 108 such that the racks 114-1, 114-2, the toothed racks 114-1, 114-2 translate in opposing directions with rotation of the pinion 108. Further, as the racks 114-1, 114-2 are affixed to the guide members 80-1, 80-2, rotation of the pinion 108 causes divergent or convergent movement of the guide members 80-1, 80-2 along a translational axis (parallel to axis 100 identified in FIGS. 5 and 6). The guide members 80-1, 80-2 diverge or converge away from or toward, as the case may be, the centerline or longitudinal axis of the joystick 64, 66 (and the below-described lower joystick extension 128) when the joystick 64, 66 is in the home or neutral position. The guide members 80-1, 80-2 may slide along one or more rails 116 (one of which can be seen in FIGS. 3 and 4) when driven by rotation of the pinion 108. Non-illustrated bearings or low friction coatings may also be provided to facilitate low friction movement of the guide members 80-1, 80-2, if desired.

A dual rack-and-pinion arrangement is thus utilized to mechanically link the output of the actuator 82 to the guide members 80-1, 80-2 in the illustrated example, thereby providing convergent or divergent movement of the guide members 80-1, 80-2 in a synchronized manner. In further embodiments, a different mechanical linkage or system can be utilized to couple the output of the actuator 82 to the guide members 80-1, 80-2, while driving such convergent or divergent movement; e.g., a system including flexible linkages (e.g., belts or cables), a scissor linkage, a shaft having twin opposing threads engaged by two or more nuts, or the like may be utilized for this purpose. Further, the joystick guidance mechanism 78 need not include two guide members 80-1, 80-2, which undergo convergent or divergent movement in all embodiments of the present disclosure. Instead, in further embodiments, a single guide member similar to the combination of guide members 80-1, 80-2 could be positioned beneath the generally spherical region 84 of the joystick 64, 66 and moved vertically upward or downward to restrict joystick movement of the predetermined track pattern when desired. Other embodiments of the variable track joystick device 48 can incorporate cable-and-reel mechanisms to selectively confine joystick movement; e.g., by attaching cables to different points of the generally spherical region 84 of the joystick 64, 66 and selectively resisting cable let-out utilizing reel mechanisms in a manner similar to certain Artificial Force Feedback (AFF) arrangements. Various other arrangements are also possible.

Figure 7:
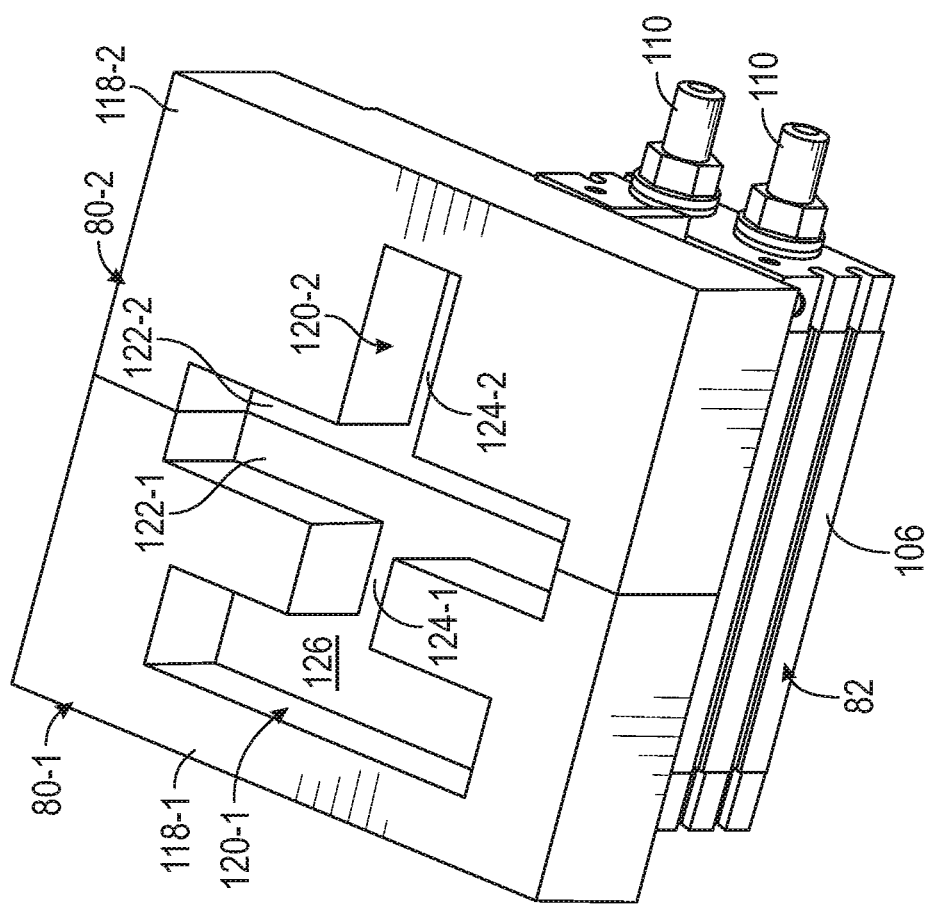
FIGS. 7 and 8 are isometric view of an example joystick guidance mechanism included in the variable track joystick device shown in FIGS. 3-6, as illustrated in a blocking position (corresponding to the first mode) and a non-blocking position (corresponding to the second mode), respectively.
Figure 8:
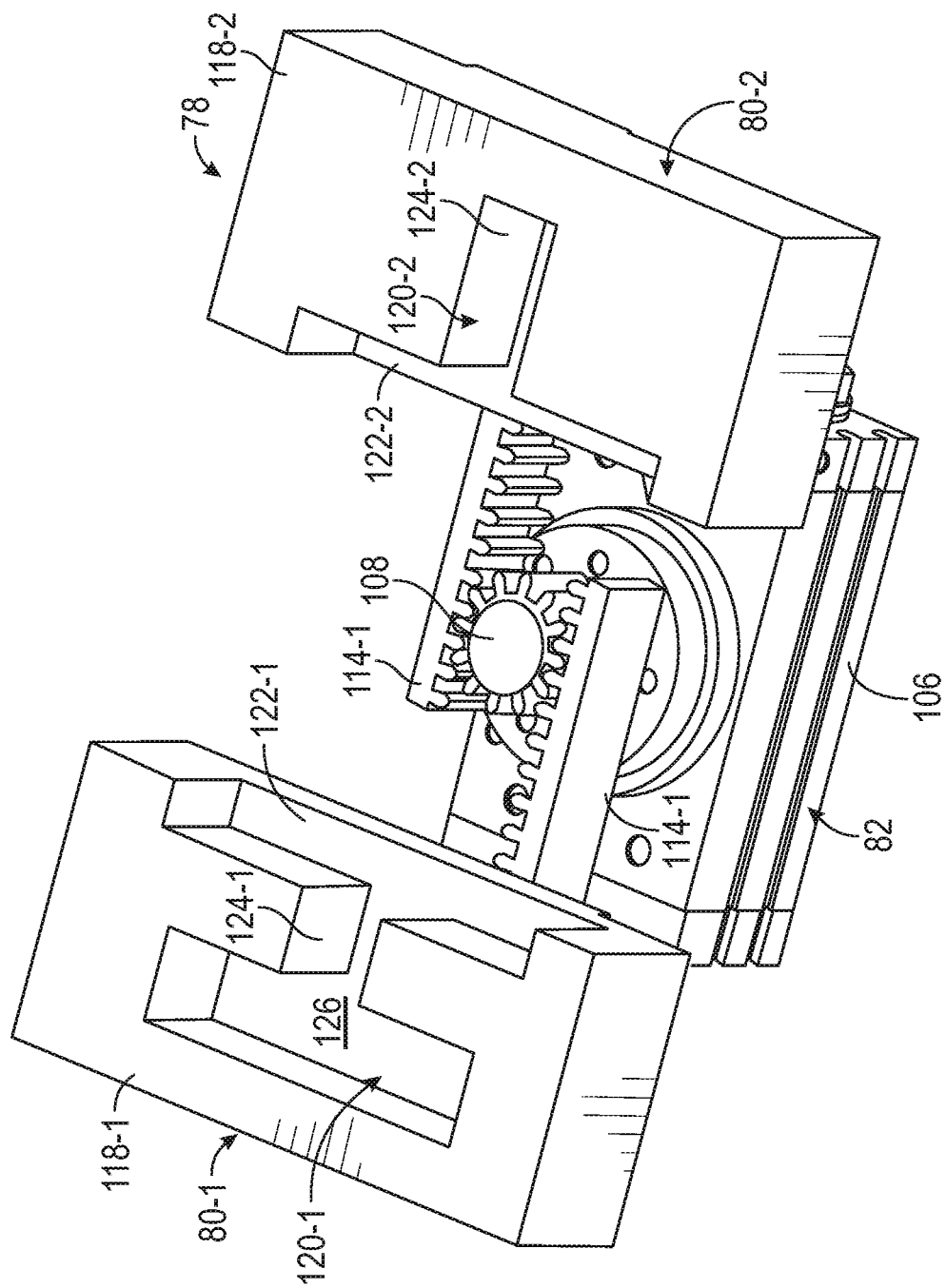

The guide members 80-1, 80-2 are further shown in FIGS. 7 and 8 in the blocking and non-blocking positions, respectively. In the blocking position shown in FIG. 7, the guide members 80-1, 80-2 are brought into close proximity and may (but need not necessarily) contact along an interface 134 (identified in FIG. 9). Notably, the guide member 80-1 has a block-like body 118-1 in which a first portion of a fixed-track pattern 120-1 is formed. So too does the guide member 80-2 have a block-like body 118-2 in which a second portion of a fixed-track pattern 120-2 is provided. The fixed-track pattern portions 120-1, 120-2 are defined by a number of intersecting grooves or open channels 122, 124, 126 formed in the bodies 118-1, 118-2 of the guide members 80-1, 80-2. When moved into the blocking position shown in FIG. 7, the fixed-track pattern portion 120-1 combines with the fixed-track pattern portion 120-2 to form a complete fixed-track pattern 120. The fixed-track pattern 120 can have various different geometries and dimensions, which may vary depending upon various factors including, for example, the work vehicle function controlled with the variable track joystick device 48 when operating in the mode corresponding to the blocking position of the movable guide members 80-1, 80-2.

Referring collectively to FIGS. 3-8, and shown most clearly in FIGS. 5 and 6, the joystick base 66 further includes a lower joystick extension 128 (colloquially, a "tail" or "stinger") opposite the joystick handle 64. The lower joystick extension 128 of the joystick 64 travels in the fixed-track pattern 120-1 when the joystick 64, 66 is manipulated by an operator and the guide members 80-1, 80-2 are moved into the blocking position shown in FIG. 7. The lower joystick extension 128 has a rod-like or post-like shape, which extends from the generally spherical region 84 opposite the joystick handle 64 and may be substantially co-axial therewith. The lower joystick extension 128 may be rigidly coupled to the joystick handle 64, whether formed as a single piece or assembled from any number of components. The lower joystick extension 128 thus also rotates about the axes 100, 102 (FIGS. 5 and 6) along with rotation of the joystick handle 64, although the movement of the lower joystick extension 128 will generally be opposite that of the joystick handle 64 (considered as looking down onto the joystick 48 along axis 94) as the lower joystick extension 128 is located at the opposing end or pole of the spherical region 84 of the joystick 64, 66.

Figure 9:
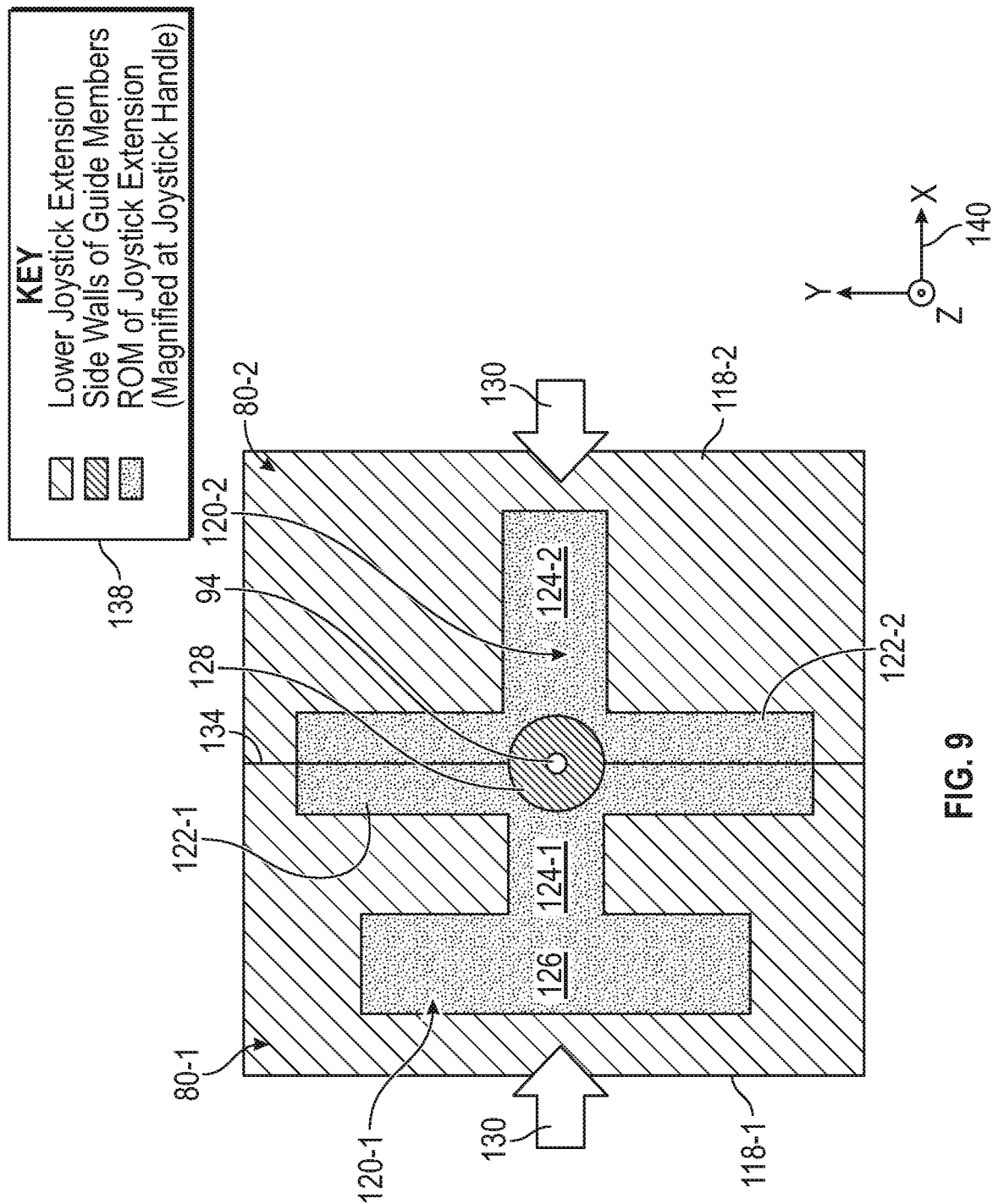
FIGS. 9 and 10 schematically illustrate the different ROMs of the example variable track joystick device shown in FIGS. 3-8 when the joystick guidance mechanism is in the blocking position (corresponding to the first mode) and in the non-blocking position (corresponding to the second mode), respectively.
Figure 10:
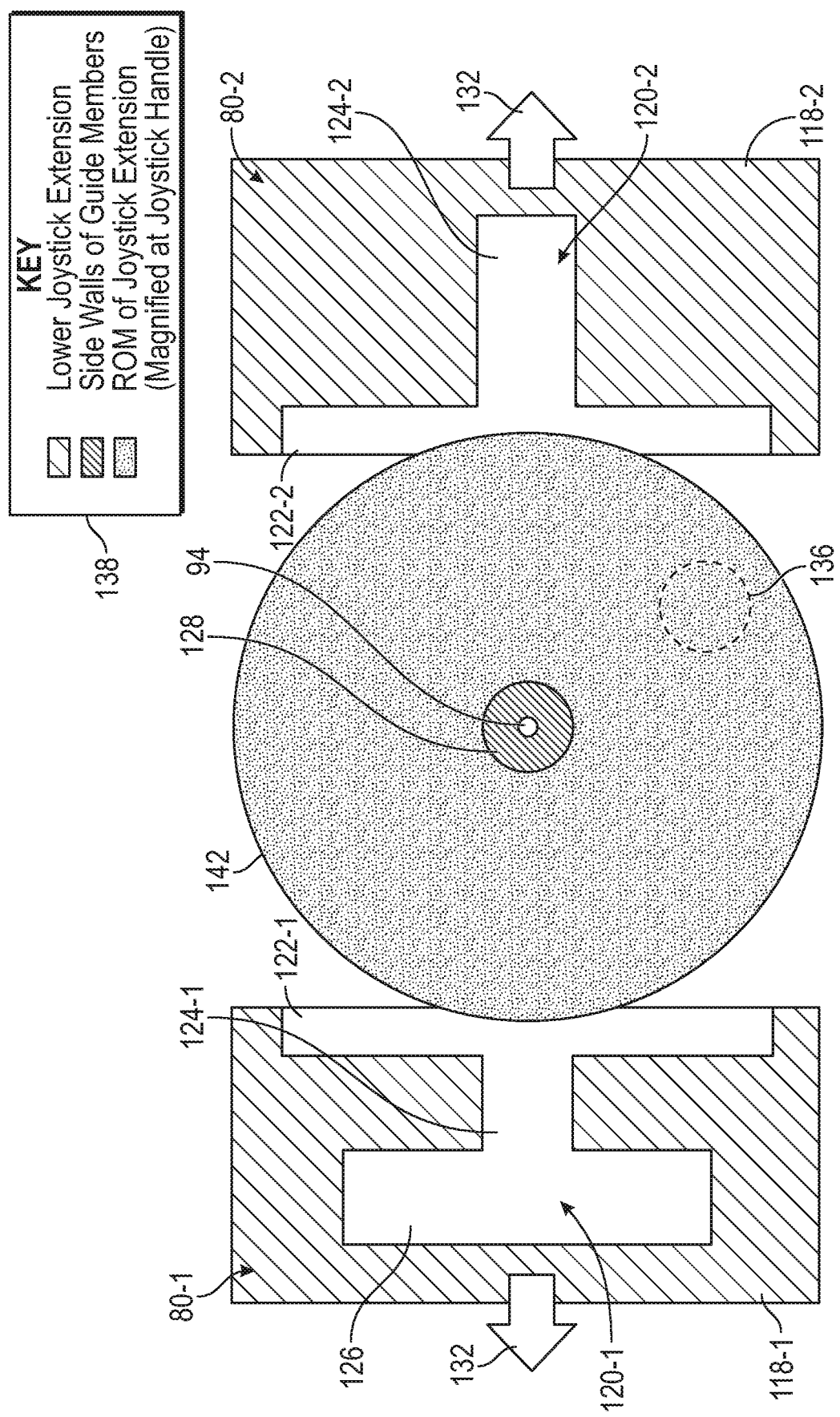

The manner in which the guide members 80-1, 80-2 are moved between the blocking and non-blocking positions to selectively restrict movement of the joystick 64, 66 is further illustrated in FIGS. 9 and 10. Convergent movement of the guide members 80-1, 80-2 from the non-blocking position into the blocking position is represented in FIG. 9 by arrows 130. Conversely, divergent movement of the guide members 80-1, 80-2 from the blocking position into the non-blocking position is represented in FIG. 10 by arrows 132. When moved into the blocking position (FIG. 9), the guide members 80-1, 80-2 may contact, or at least come into close proximity, along the interface 134, as previously noted. The lower joystick extension 128 is further shown in FIGS. 9 and 10, as is the longitudinal axis 94 of the joystick 64, 66 when in the centered, non-displaced, or home position shown in FIGS. 3, 5, and 6. Thus, in these positions, the lower joystick extension 128 remains centered at a location vertically below the center-point of the generically spherical region 84 of the joystick 64, 66 at which axes 100, 102 (FIGS. 5 and 6) intersect. For comparison, the dashed circle 136 shown in FIG. 10 marks the location into which the lower joystick extension 128 is moved when the joystick 64, 66 is rotated into the position shown in FIG. 4.

A key 138 appears at the top of FIGS. 9 and 10 and indicates the fill (cross-hatch and dot stippling) patterns denoting the lower joystick extension 128, the sidewalls of the guide members 80-1, 80-2, and the ROM of the lower joystick extension 128 in the first mode (FIG. 9) and the second mode (FIG. 10). Here, the ROM of the lower joystick extension 128 will generally correspond to the ROM of the joystick handle 64 and the joystick 64, 66. However, it should be appreciated that, due to the disparity between the length of the lower joystick extension 128 and the joystick handle 64, the ROM of the joystick handle 64 (considered at the topmost point of the handle 64) will be magnified relative to the ROM of the lower joystick extension 128. Additionally, as the joystick handle 64 and the lower joystick extension 128 are position on opposing sides of (as polar opposites relative to) the generally spherical region 84, the movement of the joystick handle 64 will generally be the inverse of the movement of the lower joystick extension 128 considered from a top view looking downward onto the joystick device 48; that is, as viewed along an axis co-axial with the longitudinal axis 94 when in the joystick 64, 66 is in the normal or home position.

Addressing FIG. 9 in greater detail, rotation of the joystick 64, 66 about the axes 100, 102 (FIGS. 5 and 6) is permitted only to the extent allowed by the physical interaction between the lower joystick extension 128 and the fixed-track pattern 120 formed by the guide members 80-1, 80-2 when in the blocking position. For convenience of reference, the movement of the lower joystick extension 128 will be described as sliding movement or travel of the lower joystick extension 128 within the linear tracks 122, 124, 126 forming the fixed-track pattern 120, as discussed below with reference to coordinate legend 140 appearing in FIG. 9. It will be understood, however, that such "sliding movement" or "travel" of the lower joystick extension 128 within the linear tracks 122, 124, 126 is due to rotation of the lower joystick extension 128 and, more generally, the joystick 64, 66 about the rotational axes 100, 102 (FIGS. 5 and 6) defined by the ball-and-socket interface created between the generally spherical region of 84 of the joystick 64, 66 and the walls 86, 88 of the support housing 68, as previously described in connection with FIGS. 3 and 4.

As stated above, the particular pattern or geometry of the fixed-track pattern 120 will vary embodiments, as will the manner in which joystick movement along the fixed-track pattern 120 affects the work vehicle function controlled when the joystick device 48 operates in the first mode. In the present example, the fixed-track pattern 120 may be described as principally formed by a plus-shaped or cross-shaped (cruciform) central portion defined by linear tracks 122, 124. The left half 122-1 of the linear track 122 is defined by a slot or open channel formed in the guide member 80-1, while the right half 122-2 of the linear track 122 is defined by a slot or channel formed in the guide member 80-2. Similarly, approximately half of linear track 124 (hereafter, "left wing 124-1") is defined by a slot or open channel formed in the guide member 80-1, while the right half 124-2 (hereafter, "right wing 124-2") of the linear track 124 is defined by a slot or channel formed in the guide member 80-2. Here, the tracks 122, 124 have substantially linear or straight geometries and form a perpendicular angle relative to one another. In other embodiments, the tracks 122, 124 may intersect at a different angle or have different shapes, such as a slightly bowed or curved geometry.

With continued reference to FIG. 9, the fixed-track pattern 120 further includes a third linear track 126 defined by a slot or open channel, which is formed entirely in the guide member 80-1. The third linear track 126 is intersected by the left wing 124-1 of linear track 124 formed in the guide member 80-1. When the variable track joystick device 48 is selectively utilized to control the transmission of tractor 20 (FIG. 1) or another work vehicle when operating in the first mode, the third linear track 126 may be provided for so-called "creep control"; that is, for relatively fine, small increment speed adjustments over a limited speed range suitable for slowly navigating the tractor 20 in a forward or backward direction. This may useful when, for example, an implement is attached or detached from the front or rear end of the tractor 20. In other instances, the third linear track 126 may differ in geometry or location (e.g., be repositioned to the end of the portion 124-2 of the linear track 124) or may be omitted entirely.

By way of non-limiting example, the transmission of the tractor 20 may be controlled as follows when the joystick device 48 is placed in the first, transmission control mode (FIG. 9). Beginning from the home position shown in FIG. 9, rotation of the joystick handle 64 in a forward direction (away from the body of an operator and generally corresponding rotation about axis 100 in a first direction) results in movement of the lower joystick extension 128 in a rearward direction generally along the Y-axis of legend 140. Certain ones of sensors 70 detect this movement and send corresponding signals to the controller 58, which then provides the appropriate signals to transmission actuators 60 (FIG. 2) to translate the operator commands into operational changes within the tractor transmission 50. In this instance, rotation of the joystick handle 64 in the forward direction may cause the tractor 20 to accelerate, with the degree of acceleration increasing with increasing displacement of the joystick handle 64 away from the home position. Conversely, rotation of the joystick in a rearward direction (toward the body of the operator and corresponding to rotation about axis 100 in a second direction) results in movement of the lower joystick extension 128 in a forward direction (upward along the Y-axis of legend 140 in the orientation shown in FIG. 9). Such motion is detected by the sensors 70, reported to the controller 58, and then translated into deceleration of the tractor transmission 50.

Again beginning from the home position shown in FIG. 9, rotation of the joystick handle 64 to the left in FIG. 9 (corresponding to rotation about axis 102 in a first direction) results in movement of the lower joystick extension 128 to the right and, thus, into the wing 124-2 of the linear track 124. This may be detected by the sensors 70, reported to the controller 58, and then controller 58 may convert such movement of the joystick 64, 66 into an operator command to set the active speed of the tractor. Finally, rotation of the joystick handle 64 to the left in FIG. 9 (corresponding to rotation about axis 102 in a second direction) results in movement of the lower joystick extension 128 to the right, with the lower joystick extension 128 traveling into the wing 124-1 of the linear track 124. From here, the operator may move the joystick 64, 66 to cause the lower joystick extension 128 to enter the linear track 126. Forward movement of the joystick 64, 66 from this position results in travel of the lower joystick extension 128 into the lower portion of the track 126 shown in FIG. 9 and limited speed increase in the crawling mode of the tractor transmission 50. Conversely, rearward movement of the joystick 64, 66 from this position the mid-portion of the track 126 intersected by the wing 124-1) results in travel of the lower joystick extension 128 into the upper portion of the track 126 shown in FIG. 9 and limited speed decrease in the crawling mode of the tractor transmission 20. In further embodiments, the location of the track 126 may be repositioned to the other side of the wing 124-2 such that an operator rotates the joystick handle 64 in the right direction to set the active speed of the tractor and in the left position to access the crawling function of the tractor 20.

Addressing lastly FIG. 10, in this scenario, the variable track joystick device 48 now operates in the second (loader control) mode in which joystick movement controls movement of the FEL system 24 (FIG. 1). Accordingly, the controller 58 has commanded the actuator 82 to move the guide member 80-1, 80-2 into the non-blocking position shown in FIG. 10. As indicated by arrows 132, the guide members 80-1, 80-2 have thus diverged away from the axis 94 and no longer interfere (or interfere to a lesser extent) with movement of the lower joystick extension 128 over the full ROM permitted by the joystick-housing coupling. Stated differently, when the guide members 80-1, 80-2 are moved into the non-blocking position shown in FIG. 10, the guide members 80-1, 80-2 may be displaced outside of (no longer encroach into) the ROM of the lower joystick extension 128. As indicated by the circular graphic 142, the lower joystick extension 128 can freely travel over a generally circular ROM (as seen looking along the axis 94 when the joystick 64, 66 is in the home position), with the outer boundaries of the ROM limited by inherent constraints of the coupling between the joystick 64, 66 and the support housing 68. The joystick handle 64 may thus rotated about either or both of axes 100, 102 (FIGS. 5 and 6) independent of the angular position of the joystick 64, 66 limited only by the outer periphery of the maximum or full ROM boundary, represented by circle 142. Movement of the joystick 64, 66, including movement of the joystick base 66 and lower joystick extension 128, is thus not confined to any particular track pattern. This may again be appreciated by referring to the position of the joystick 64, 66 in FIG. 4 and the corresponding position of the lower joystick extension 128 identified in FIG. 10 by dashed circle 136, noting that the lower joystick extension 128 cannot be moved into this position due to the physical impediment provided by the guide member 80-2 when in the blocking position shown in FIG. 9.

As was the case with the manner in which the joystick device 48 controls the tractor transmission 50. However, in one control scheme, movement of the joystick handle 64 in a forward direction (away from the body of an operator), and thus movement of the lower joystick extension 128 in a rearward direction, results in lowering of the FEL bucket 30 (FIG. 1). Conversely, movement of the joystick handle 64 in a rearward direction (toward the body of an operator), and corresponding movement of the lower joystick extension 128 in a forward direction, results in raising the FEL bucket 30 (FIG. 1). Movement of the joystick handle 64 to the left, and corresponding movement of the lower joystick extension 128 to the right, results in tilting of the FEL bucket 30 (FIG. 1) toward an upright or "closed" orientation. Finally, movement of the joystick handle 64 to the right, and corresponding movement of the lower joystick extension 128 to the left, results in tilting of the FEL bucket 30 (FIG. 1) toward a scoop or "open" position.

Additional Discussion of the Guide Member(S) Included in Embodiments of the Variable Track Joystick Device In the above-described embodiment, selectively physical obstruction or blocking is utilized to selectively confine movement of the joystick to a predetermined track pattern when appropriate. Such selective physical obstruction is accomplished by moving two guide members into and out of the ROM of a portion of the joystick. In other instances, a different number of guide members may be utilized to restrict joystick motion, potentially with different sets of guide members moved into and out of engagement with a lower portion of the joystick to restrict joystick movement to different fixed-track pattern. Further, other types of physical guide members can be utilized to selectively restrict joystick movement in embodiments including, for example, cable-and-reel mechanisms of the type previously described. In still further instances, electromagnetic sub-systems can be incorporated into the joystick device and utilized to selectively restrict joystick movement; e.g., through the usage of hydraulic cylinders, AFF motors, or the like, which can be selectively commanded to impede movement of the joystick by the controller in accordance with, for example, the above-described control scheme. As another possibility, permanent magnets or points of variable reluctant may be provided around an outer, generally spherical region of the joystick similar to the generally spherical region 84 of the joystick 64, 66 discussed above in connection with FIGS. 3-6. Electromagnets may further be distributed around a socket in which the generally spherical region is received to form a ball-and-socket coupling. The electromagnets may then be selectively energized by a controller, when appropriate, to restrict movement of the joystick to a desired fixed-track pattern. Such an electromagnetic sub-system may thus be generally considered a "joystick guidance mechanism" in such embodiments.

Enumerated Examples of Variable Track Joystick Devices for Usage within Work Vehicles The following examples of the variable track joystick device are further provided, which are numbered for ease of reference.

1. In a first embodiment, a variable track joystick device is utilized to control at least first and second work vehicle functions. The variable track joystick device includes a support housing, a joystick movable with respect to the support housing, a joystick guidance mechanism coupled to the support housing and controllable to selectively confine joystick movement to a predetermined track pattern, and a controller operably coupled to the joystick guidance mechanism. The controller is configured to: determine when the variable track joystick device is placed in a selected one of (i) a first mode in which joystick movement controls the first work vehicle function and (ii) a second mode in which joystick movement controls the second work vehicle function. The controller further command the joystick guidance mechanism to restrict joystick movement to the predetermined track pattern when the variable track joystick device is placed in the first mode, while permitting joystick movement outside of the predetermined track pattern when the variable track joystick device is placed in the second mode.

2. The variable track joystick device of example 1, wherein the first work vehicle function includes a transmission control function, while the second work vehicle function includes an implement control function.

3. The variable track joystick device of example 2, wherein the implement control function includes a loader control function.

4. The variable track joystick device of example 1, wherein the joystick guidance mechanism restricts joystick movement to at least one linear track when confining joystick movement to the predetermined track pattern.

5. The variable track joystick device of example 4, wherein the joystick guidance mechanism restricts joystick movement to multiple intersecting linear tracks when confining joystick movement to the predetermined track pattern.

6. The variable track joystick device of example 1, wherein the joystick is rotatable relative to the support housing about a first rotational axis and about a second rotational axis perpendicular to the first rotational axis. Additionally, the joystick guidance mechanism may restrict joystick movement to at least first and second linear tracks parallel to the first and second rotational axes, respectively, when confining joystick movement to the predetermined track pattern.

7. The variable track joystick device of example 6, wherein the first and second linear tracks intersect at a home position of the joystick.

8. The variable track joystick device of example 1, further including a mode selection interface enabling an operator of the work vehicle to switch between the first and second mode. Further, the controller may determine when the variable track joystick device is placed in a selected one of the first and second modes based, at least in part, on operator input received via the mode selection interface.

9. The variable track joystick device of example 1, wherein the joystick includes a joystick handle projecting from the support housing, a joystick base received within the support housing, and a coupling between the joystick base and the support housing. The coupling permits rotation of the joystick base over a full ROM.

10. The variable track joystick device of example 9, wherein the joystick guidance mechanism includes at least one guide member within the support housing, as well as an actuator coupled to the at least one guide member and to the controller. The actuator is configured to selectively move the at least one guide member into a blocking position in which the at least one guide member physically prevents movement of the joystick base over the full ROM.

11. The variable track joystick device of example 1, wherein the joystick guidance mechanism includes an actuator in signal communication with the controller. First and second guide members are disposed within the support housing and mechanically linked to the actuator. The first and second guide members are movable between (i) a non-blocking position and (ii) a blocking position in which the first and second guide members physically limit joystick movement to the predetermined track pattern. The controller commands the actuator to move the first and second guide members into the block positioning when the variable track joystick device is placed in the first mode and into non-blocking position when the variable track joystick device is placed in the second mode.

12. The variable track joystick device of example 11, wherein the first and second guide members converge to define at least one linear track when moving from the non-blocking position to the blocking position.

13. A variable track joystick device utilized onboard a work vehicle is further provided. The variable track joystick device includes a support housing, a joystick having a joystick base within the support housing and a joystick handle projecting from the support housing, a coupling formed between the joystick base and the support housing, and joystick guidance mechanism. The coupling permits rotation of the joystick base over ROM relative to the support housing about first and second perpendicular axes. The joystick guidance mechanism includes at least one guide member coupled to the support housing and movable relative to the joystick base. An actuator is coupled to the at least one guide member and is controllable to selectively move the at least one guide member between (i) a blocking position in which the at least one guide member encroaches into the ROM of the joystick base to restrict joystick movement, and (ii) a non-blocking position in which the at least one guide member resides outside of the ROM of the joystick base.

14. The variable track joystick device of example 13, wherein the first and second guide members converge to define at least one linear track when moving from the non-blocking position to the blocking position.

15. The variable track joystick device of example 13, wherein the coupling permits movement of the joystick handle over a generally circular ROM centered on a home position of the joystick when the at least one guide member is in the non-blocking position.

Conclusion

The foregoing has thus provided embodiments of a variable track joystick device well-suited for controlling multiple work vehicle functions, while selectively limiting joystick movement to at least one predetermined track pattern as appropriate for controlling a particular work vehicle function. In the above-described example embodiment, the variable track joystick device is operable in two modes, each utilized to control a different work vehicle function via joystick movement over disparate ROMs. However, embodiments of the variable track joystick device can be operable in any practical number of modes and utilized to control three or more work vehicle functions through joystick movement, with selective confinement of the joystick to any practical number of track patterns. Further, the manner in which joystick movement is selectively confined to the predetermined track pattern (or patterns) will vary among embodiments. In many instances, joystick movement will be selectively limited to a predetermined track pattern (or track patterns) by selectively position one or more guide members to physically interfere or block movement of a lower portion of the joystick contained in the support housing, as previously described. In alternative embodiments, however, other types of physical and non-physical (e.g., electromagnetic) interfaces to selectively confine joystick movement to the predetermined track pattern (or patterns) based upon the operation mode of the variable track joystick device and the work vehicle function presently controlled utilizing the joystick device. Finally, while primary described above in connection with a particular type of work vehicle (i.e., an FEL-equipped tractor), embodiments of the variable track joystick device are not restricted to controlling any particular set of work vehicle functions and can be deployed within a wide array of work vehicle types utilized within the agricultural, mining, forestry, and construction industries.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A variable track joystick device utilized to control at least first and second work vehicle functions, the variable track joystick device comprising:
   a support housing;
   a joystick movable with respect to the support housing;
   a joystick guidance mechanism coupled to the support housing and controllable to selectively confine joystick movement to a predetermined track pattern; and
   a controller operably coupled to the joystick guidance mechanism, the controller configured to:
     determine when the variable track joystick device is placed in a selected one of (i) a first mode in which joystick movement controls the first work vehicle function and (ii) a second mode in which joystick movement controls the second work vehicle function, wherein the first work vehicle function comprises a transmission control function, while the second work vehicle function comprises an implement control function; and
     command the joystick guidance mechanism to restrict joystick movement to the predetermined track pattern when the variable track joystick device is placed in the first mode, while permitting joystick movement outside of the predetermined track pattern when the variable track joystick device is placed in the second mode.

2. The variable track joystick device of claim 1, wherein the implement control function comprises a loader control function.

3. The variable track joystick device of claim 1, wherein the joystick guidance mechanism restricts joystick movement to at least one linear track when confining joystick movement to the predetermined track pattern.

4. The variable track joystick device of claim 1, wherein the joystick is rotatable relative to the support housing about a first rotational axis and about a second rotational axis perpendicular to the first rotational axis; and
   wherein the joystick guidance mechanism restricts joystick movement to at least first and second linear tracks parallel to the first and second rotational axes, respectively, when confining joystick movement to the predetermined track pattern.

5. The variable track joystick device of claim 4, wherein the first and second linear tracks intersect at a home position of the joystick.

6. The variable track joystick device of claim 1, wherein the joystick comprises:
   a joystick handle projecting from the support housing;
   a joystick base received within the support housing; and
   a coupling between the joystick base and the support housing, the coupling permitting rotation of the joystick base over a full Range of Motion (ROM).

7. The variable track joystick device of claim 6, wherein the joystick guidance mechanism comprises:
   at least one guide member within the support housing; and
   an actuator coupled to the at least one guide member and to the controller, the actuator configured to selectively move the at least one guide member into a blocking position in which the at least one guide member physically prevents movement of the joystick base over the full ROM.

8. The variable track joystick device of claim 1, wherein the joystick guidance mechanism comprises:
   an actuator in signal communication with the controller;
   first and second guide members within the support housing and mechanically linked to the actuator, the first and second guide members movable between (i) a non-blocking position and (ii) a blocking position in which the first and second guide members physically limit joystick movement to the predetermined track pattern;
   wherein the controller commands the actuator to move the first and second guide members into the block positioning when the variable track joystick device is placed in the first mode and into non-blocking position when the variable track joystick device is placed in the second mode.

9. The variable track joystick device of claim 8, wherein the first and second guide members converge to define at least one linear track when moving from the non-blocking position to the blocking position.

10. A variable track joystick device utilized to control at least first and second work vehicle functions, the variable track joystick device comprising:
    a support housing;
    a joystick movable with respect to the support housing;
    a joystick guidance mechanism coupled to the support housing and controllable to selectively confine joystick movement to a predetermined track pattern; and
    a controller operably coupled to the joystick guidance mechanism, the controller configured to:
      determine when the variable track joystick device is placed in a selected one of (i) a first mode in which joystick movement controls the first work vehicle function and (ii) a second mode in which joystick movement controls the second work vehicle function; and
      command the joystick guidance mechanism to restrict joystick movement to the predetermined track pattern when the variable track joystick device is placed in the first mode, while permitting joystick movement outside of the predetermined track pattern when the variable track joystick device is placed in the second mode;

wherein the joystick guidance mechanism restricts joystick movement to multiple intersecting linear tracks when confining joystick movement to the predetermined track pattern.

11. A variable track joystick device utilized to control at least first and second work vehicle functions, the variable track joystick device comprising:
a support housing;
a joystick movable with respect to the support housing;
a joystick guidance mechanism coupled to the support housing and controllable to selectively confine joystick movement to a predetermined track pattern;
a controller operably coupled to the joystick guidance mechanism, the controller configured to:
determine when the variable track joystick device is placed in a selected one of (i) a first mode in which joystick movement controls the first work vehicle function and (ii) a second mode in which joystick movement controls the second work vehicle function; and
command the joystick guidance mechanism to restrict joystick movement to the predetermined track pattern when the variable track joystick device is placed in the first mode, while permitting joystick movement outside of the predetermined track pattern when the variable track joystick device is placed in the second mode; and
a mode selection interface enabling an operator of the work vehicle to switch between the first and second modes; and
wherein the controller determines when the variable track joystick device is placed in a selected one of the first and second modes based, at least in part, on operator input received via the mode selection interface.

12. A variable track joystick device utilized onboard a work vehicle, the variable track joystick device comprising:
a support housing;
a joystick having a joystick base located within the support housing and a joystick handle projecting from the support housing;
a coupling provided between the joystick base and the support housing, the coupling permitting rotation of the joystick base over a Range of Motion (ROM) relative to the support housing about first and second perpendicular axes;
a joystick guidance mechanism, comprising:
at least one guide member coupled to the support housing and movable relative to the joystick base; and
an actuator mechanically linked to the at least one guide member and controllable to selectively move the at least one guide member between (i) a blocking position in which the at least one guide member encroaches into the ROM of the joystick base to restrict joystick movement, and (ii) a non-blocking position in which the at least one guide member resides outside of the ROM of the joystick base; and
a controller in signal communication with the actuator, the controller configured to:
determine when the variable track joystick device is placed in a selected one of (i) a first mode in which joystick movement controls functioning of a transmission of the work vehicle and (ii) a second mode in which joystick movement controls functioning of a work implement of the work vehicle; and
command the actuator to move the at least one guide member into the blocking position when the variable track joystick is placed in the first mode and into the non-blocking position when the variable track joystick is placed in the second mode.

13. The variable track joystick device of claim 12, wherein the at least one guide member includes a first guide member and a second guide member that converge to define at least one linear track when moving from the non-blocking position to the blocking position.

14. The variable track joystick device of claim 12, wherein the coupling permits movement of the joystick handle over a generally circular ROM centered on a home position of the joystick when the at least one guide member is in the non-blocking position.

15. A work vehicle comprising:
a transmission;
a work implement; and
a variable track joystick device comprising:
a support housing;
a joystick movable with respect to the support housing;
a joystick guidance mechanism coupled to the support housing and controllable to selectively confine joystick movement to a predetermined track pattern; and
a controller operably coupled to the joystick guidance mechanism, the controller configured to:
determine when the variable track joystick device is placed in a selected one of (i) a transmission control mode in which joystick movement controls functioning of the transmission and (ii) a work implement control mode in which joystick movement controls functioning of the work implement; and
command the joystick guidance mechanism to restrict joystick movement to the predetermined track pattern when the variable track joystick device is placed in the transmission control mode, while permitting joystick movement outside of the predetermined track pattern when the variable track joystick device is placed in the work implement control mode.

16. The work vehicle of claim 15, wherein the joystick guidance mechanism restricts joystick movement to multiple intersecting linear tracks when confining joystick movement to the predetermined track pattern.

17. The work vehicle of claim 16, wherein the joystick guidance mechanism comprises:
at least one guide member movably coupled to the support housing; and
an actuator coupled to the at least one guide member and controllable to selectively move the at least one guide member between (i) a blocking position in which the at least one guide member encroaches into the ROM of the joystick base to restrict joystick movement, and (ii) a non-blocking position in which the at least one guide member resides outside of the ROM of the joystick base;
wherein the controller commands the actuator to move the at least one guide member into the blocking position when the variable track joystick is placed in the transmission control mode and into the non-blocking position when the variable track joystick is placed in the work implement control mode.

18. The work vehicle of claim 15, wherein the work implement comprises a loader, and wherein the work implement control mode comprises a loader control mode.

* * * * *